United States Patent
Hegli et al.

(10) Patent No.: US 8,438,386 B2
(45) Date of Patent: May 7, 2013

(54) SYSTEM AND METHOD FOR DEVELOPING A RISK PROFILE FOR AN INTERNET SERVICE

(75) Inventors: Ron Hegli, San Diego, CA (US); Hal Lonas, Carlsbad, CA (US); Christopher K. Harris, San Diego, CA (US)

(73) Assignee: Webroot Inc., Broomfield, CO (US)

( * ) Notice: Subject to any disclaimer, the term of this patent is extended or adjusted under 35 U.S.C. 154(b) by 319 days.

(21) Appl. No.: 12/709,504

(22) Filed: Feb. 21, 2010

(65) Prior Publication Data

US 2010/0269168 A1  Oct. 21, 2010

Related U.S. Application Data

(60) Provisional application No. 61/171,264, filed on Apr. 21, 2009, provisional application No. 61/241,389, filed on Sep. 10, 2009.

(51) Int. Cl.
*H04L 29/06* (2006.01)
*G06F 17/30* (2006.01)
*G06F 17/00* (2006.01)
*G06F 7/04* (2006.01)
*G06F 15/167* (2006.01)
*G06F 15/16* (2006.01)
*G06F 15/173* (2006.01)

(52) U.S. Cl.
USPC ............ 713/166; 713/153; 713/165; 726/4; 726/11; 726/12; 726/29; 709/216; 709/217; 709/224; 709/225

(58) Field of Classification Search ............ 726/11, 726/4, 12, 29; 713/153, 165, 166; 709/216, 709/217, 224, 225
See application file for complete search history.

(56) References Cited

U.S. PATENT DOCUMENTS

| | | |
|---|---|---|
| 6,606,659 B1 | 8/2003 | Hegli et al. |
| 6,973,488 B1 | 12/2005 | Yavatkar et al. |
| 7,287,279 B2 | 10/2007 | Bertman et al. |
| 7,383,299 B1 | 6/2008 | Hailpern et al. |
| 7,406,466 B2 | 7/2008 | Roy et al. |
| 7,467,206 B2 | 12/2008 | Moore et al. |
| 7,483,982 B2 | 1/2009 | Hegli et al. |

(Continued)

OTHER PUBLICATIONS

PCT International Search Report for PCT Application No. PCT/US2010/025702, Mailed Sep. 17, 2010.

*Primary Examiner* — Aravind Moorthy
(74) *Attorney, Agent, or Firm* — Sheridan Ross P.C.

(57) ABSTRACT

A method and system for controlling access to an Internet resource is disclosed herein. When a request for an Internet resource, such as a Web site, is transmitted by an end-user of a LAN, a security appliance for the LAN analyzes a reputation index for the Internet resource before transmitting the request over the Internet. The reputation index is based on a reputation vector which includes a plurality of factors for the Internet resource such as country of domain registration, country of service hosting, country of an internet protocol address block, age of a domain registration, popularity rank, internet protocol address, number of hosts, to-level domain, a plurality of run-time behaviors, JavaScript block count, picture count, immediate redirect and response latency. If the reputation index for the Internet resource is at or above a threshold value established for the LAN, then access to the Internet resource is permitted. If the reputation index for the Internet resource is below a threshold value established for the LAN, then access to the Internet resource is denied.

26 Claims, 11 Drawing Sheets

U.S. PATENT DOCUMENTS

| | | |
|---|---|---|
| 7,493,403 B2 | 2/2009 | Shull et al. |
| 7,591,016 B2 | 9/2009 | Horne |
| 7,721,333 B2 | 5/2010 | Horne |
| 2004/0122926 A1 | 6/2004 | Moore et al. |
| 2005/0204050 A1 | 9/2005 | Turley et al. |
| 2006/0143703 A1 | 6/2006 | Hopen et al. |
| 2006/0253578 A1 | 11/2006 | Dixon et al. |
| 2007/0078675 A1 | 4/2007 | Kaplan |
| 2007/0130350 A1 | 6/2007 | Alperovitch et al. |
| 2008/0015925 A1 | 1/2008 | Sundaresan |
| 2008/0052758 A1 | 2/2008 | Byrnes |
| 2008/0082662 A1* | 4/2008 | Dandliker et al. ............ 709/225 |
| 2008/0097936 A1 | 4/2008 | Schmidtler et al. |
| 2009/0006569 A1* | 1/2009 | Morss et al. .................. 709/206 |
| 2009/0063248 A1 | 3/2009 | Chong et al. |
| 2009/0064337 A1 | 3/2009 | Chien |
| 2009/0178125 A1 | 7/2009 | Barber et al. |
| 2010/0184505 A1* | 7/2010 | Bryson et al. .................. 463/25 |

* cited by examiner

SYSTEM AND METHOD FOR DEVELOPING A RISK PROFILE FOR AN INTERNET SERVICE

CROSS REFERENCE TO RELATED APPLICATION

The present application claims priority to U.S. Provisional Patent Application No. 61/241,389, filed on Sep. 10, 2009 and U.S. Provisional Patent Application No. 61/171,264, filed on Apr. 21, 2009, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention is related to assessing risk profiles of Internet resources. More specifically, the present invention is related to a system and method for developing a risk profile for an Internet resource by generating a reputation index, based on attributes of the resource collectively referred to as the reputation vector of the resource.

2. Description of the Related Art

Management of internet access, particularly to Web sites, has been accomplished in the past using "Content Filtering", where Web sites are organized into categories and requests for Web content are matched against per-category policies and either allowed or blocked. This type of management focuses on the subject matter of a Web site, and provides visibility into, for example, how employees spend their time, and their company's network bandwidth usage, during the course of the day. These solutions also allow companies to enforce established internet usage policy (IUP) by blocking Web sites whose subject matter violates their IUP.

Security solutions, such as anti-virus products, examine file or Web page content to discover known patterns or signatures that represent security threats to users, computers, or corporate networks. These focus not on the subject matter of a site, but look for viruses and other 'malware' that are currently infecting the site. However, current solutions to management of Internet resources fail to measure the security risk associated with accessing an Internet resource in a more predictive way, before infections are isolated and signatures are identified and distributed.

A possible analogy to the reputation of an Internet resource is the credit score of an individual. A Web user would want to be informed of the reputation of a Web site before visiting it, just as a lender would want to know the reputation, the financial reputation at least, of a borrower of the lender's money.

A credit score is based on a variety of fairly tightly related factors, such as existing debt, available credit lines, on-time payments, existing credit balances, etc.

In the United States, a credit score is a number based on a statistical analysis of a person's credit files that represents the creditworthiness of that person, which is the likelihood that the person will pay their bills. A credit score is primarily based on credit information, typically from one of the three major credit agencies.

There are different methods of calculating credit scores. The best known one, FICO, is a credit score developed by the Fair Isaac Corporation. FICO is used by many mortgage lenders that use a risk-based system to determine the possibility that the borrower may default on financial obligations to the mortgage lender.

FICO® scores are provided to lenders by the three major credit reporting agencies: Equifax, Experian and TransUnion. When lenders order your credit report, they can also buy a FICO® score that is based on the information in the report. That FICO® score is calculated by a mathematical equation that evaluates many types of information from the borrower's credit report at that agency. In order for a FICO® score to be calculated on the borrower's credit report, the report must contain sufficient information—and sufficient recent information—on which to base a score. Generally, that means the borrower must have at least one account that has been open for six months or longer, and at least one account that has been reported to the credit reporting agency within the last six months.

FICO scores provide a reliable guide to future risk based solely on credit report data. FICO® scores have a 300-850® score range. The higher the score, the lower the risk. But no score says whether a specific individual will be a "good" or "bad" customer. And while many lenders use FICO® scores to help them make lending decisions, each lender has its own strategy to determine if a potential borrower is a good customer. Although FICO won't reveal exactly how it determines a credit score, it considers the following factors: payment history (35%); outstanding debt (30%); length of credit history (15%); types of credit (10%); and new credit (10%).

Returning to Internet resources, attackers have been using the Internet to attack the computers and other devices of users of the Internet. Attackers continue to take advantage of flaws in traditional security measures and bypass reputation-based systems to increase attack effectiveness.

In 2008, massive attacks were conducted that compromised hundreds of thousands of legitimate Web sites with good reputations worldwide with data-stealing malicious code. The attacks included sites from MSNBC, ZDNet, Wired, the United Nations, a large UK government site, and more. In the attacks, when a user's browser opened one of the thousands of compromised sites, a carefully crafted iframe HTML tag redirected users to a malicious site rife with exploits. As a result, malicious code, designed to steal confidential information, was launched on vulnerable machines. In addition to Web exploits, email spammers are also taking advantage of the reputation of popular email services like Yahoo! and Gmail to bypass anti-spam systems.

Also, spammers use sophisticated tools and bots to break the "CAPTCHA-" systems that were developed to keep email and other services safe from spammers and other malicious activity. MICROSOFT Live Mail, GOOGLE's popular Gmail service and Yahoo! mail services were all compromised by this breakthrough method. Subsequently, spammers have been able to sign up for the free email accounts on a mass basis and send out spam from email accounts with good reputations. With a free signup process, access to a wide portfolio of services and domains that are unlikely to be blacklisted given their reputation, spammers have been able to launch attacks on millions of users worldwide while maintaining anonymity.

Thus, prior art solutions have focused on security when accessing known infected sites in the Internet from a network such as a local area network or a wide area network.

Hegli et al., U.S. Pat. No. 7,483,982 for Filtering Techniques For Managing Access To Internet Sites Or Other Software Applications discloses a system and method for controlling an end user's access to the Internet by blocking certain categorized sites or limiting access based on bandwidth usage.

Hegli et al., U.S. Pat. No. 6,606,659 for a System And Method For Controlling Access To Internet Sites discloses a system and method for controlling an end user's access to the Internet by blocking certain categorized sites or limiting the number of times the end user can access an Internet site.

Yavatkar et al., U.S. Pat. No. 6,973,488 for Providing Policy Information To A Remote Device discloses a method for distributing high level policy information to remote network devices using a low-level configuration.

Turley et al., U.S. Patent Publication Number 2005/0204050 for a Method And System For Controlling Network Access discloses a system and method for controlling access to a specific site by using a gateway that assigns incoming traffic to specific sections of the site.

Shull et al., U.S. Pat. No. 7,493,403 for Domain Name Validation discloses accessing domain name registries to determine the ownership of a domain and monitoring the domain and registry.

Roy et al., U.S. Pat. No. 7,406,466 for a Reputation Based Search discloses using a search engine to present search results associated with measures of reputation to overcome the problem of META tags skewing the search results.

Hailpern et al., U.S. Pat. No. 7,383,299 for a System And Method For Providing Service For Searching Web Site Addresses discloses Moore et al., U.S. Pat. No. 7,467,206, for a Reputation System For Web Services discloses a system and method for selecting a Web service from a search engine list which is ranked based on reputation information for each Web service.

Definitions for various terms are set forth below.

FTP or File Transfer Protocol is a protocol for moving files over the Internet from one computer to another.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

Parser is a component of a compiler that analyzes a sequence of tokens to determine its grammatical structure with respect to a given formal grammar. Parsing transforms input text into a data structure, usually a tree, which is suitable for later processing and which captures the implied hierarchy of the input. XML Parsers ensure that an XML document follows the rules of XML markup syntax correctly.

URL or Uniform Resource Locator is a address on the World Wide Web.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access. Servers usually contain one or more processors (CPUs), memories, storage devices and network interface cards. Servers typically store the HTML documents and/or execute code that generates Web-pages that are sent to clients upon request. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

The prior art fails to provide solutions to the problems with accessing the Internet.

BRIEF SUMMARY OF THE INVENTION

The present invention provides a predictive approach based on a statistical model built on a broad sampling of Internet resources with varying degrees of risk. The present invention focuses on the reputation of a Web site, or any Internet-based service or resource. The reputation incorporates many factors that are relevant to the overall safety of visiting a site. The reputation assesses the over-time track record of the site and the provider that operates the web site, the current characteristics of the pages and related files composing the site, and reputations of sites linked to the site and of referrers to the site. The overall assessment is expressed as a score, not unlike a FICO score, that predicts the potential risk of visiting the site which can be used to protect users from inadvertently visiting or utilizing higher-risk sites or services within the Internet.

There are many components of reputation available within the Internet. Much like other scoring mechanisms, such as credit scoring, the factors to be considered must be decided upon, and the weight that each factor will have in the overall "score" must be determined.

The present invention provides a system and method for defining a reputation of an Internet service such as a Web site.

A basic element of reputation is how long a domain has been registered to a particular company/entity. In addition, a domain which frequently changes hands is also interesting in a negative way relative to reputation.

Preferred steps of the invention are: evaluation of the important features to be included in the collection of reputation-relevant features referred to as the reputation vector; collection of the reputation vectors for a large sample of Internet resource; training of a classifier based on training sets of known high and low reputation services/sites; testing of a model against a wide variety of random samples; run-time evaluation of requests for the Internet resource using the developed classifier and responding to reputation index information requests from clients which enforce network security policy.

The present invention preferably protects users against threats which are typically are not related to the subject matter of the service, or site. The present invention preferably protects users and networks from zero-day threats which have not been characterized or included in anti-virus signature files. The present invention preferably allows network managers to protect users and infrastructure without having to restrict access to particular categories of content. The present invention preferably allows higher security which is independent of cultural or moral biases related to many categories of content.

One aspect of the present invention is a method for controlling access to a Web site. The method includes transmitting a request for a Web site from a browser on a client-side device of a local area network. The Web site resides at a first server. The method also includes receiving the request for the Web site at a security appliance of the local area network prior to transmission of the request over the Internet. The method also includes analyzing a reputation vector for the Web site at the security appliance. The reputation vector includes a plurality of factors for the Web site comprising at least one or more of country of domain registration, country of service hosting, country of an internet protocol address block, age of a domain registration, popularity rank, internet protocol address, number of hosts, top-level domain, a plurality of run-time behaviors, JavaScript block count, picture count, immediate redirect and response latency. The method also includes generating a reputation index for the Web site based on the analysis of the plurality of factors. The method also includes determining if the reputation index for the Web site is above a threshold value established for the local area network. The method also includes transmitting a decision transmission to the browser of the client-side device.

If the reputation index for the Web site is above the threshold value, the method further includes transmitting the request for the Web-site over the Internet to a server for the Web site and receiving a Web page for the Web site at the local area network. In this situation, the decision transmission is the Web page for the Web site. If the reputation index for the Web site is at or below the threshold value, the decision transmission is a Web page from the local area network The method can further include obtaining the plurality of factors for the Web site. Obtaining the plurality of factors for the Web site comprises accessing the Web site, analyzing a plurality of HTML documents for the Web site by crawling the Web site. Accessing the Web site comprises rendering a page for the Web site. Analyzing the plurality of HTML documents comprises determining the JavaScript block count and the picture count of each of the HTML documents.

Another aspect of the present invention is a system for controlling access to a Web site. The system includes a network, a Web site and a local area network. The network is the Internet. The Web site is hosted at a first server and accessible over the Internet. The local area network includes a plurality of client-side devices and a security appliance. Each of the client side devices has a browser. The security appliance controls access to the Internet by each of the plurality of client-side devices. The security appliance has a service engine for analyzing a reputation vector for the Web site and generating a reputation index for the Web site from the reputation vector. The reputation vector is based on a plurality of factors for the Web site. The plurality of factors comprises at least one or more of country of domain registration, country of service hosting, country of an internet protocol address block, age of a domain registration, popularity rank, internet protocol address, number of hosts, top-level domain, a plurality of run-time behaviors, JavaScript block count, picture count, immediate redirect and response latency. Access to the Web site by any of the plurality of client-side devices is determined on the reputation index exceeding a threshold value established for the local area network.

Another aspect of the present invention is a method for controlling access to an Internet resource utilizing a reputation generating site. The method includes transmitting a request for an Internet resource from a browser for a client-side device of a local area network. The Internet resource resides at a first server. The method also includes receiving the request for the Internet resource at reputation generating site prior to transmission of the request over the Internet to the first server. The method also includes analyzing a reputation vector for the Internet resource at the reputation generating site. The reputation vector includes a plurality of dimensions for the Internet resource comprising at least two of country of domain registration, country of service hosting, country of an internet protocol address block, age of a domain registration, popularity rank, internet protocol address, number of hosts, to-level domain, a plurality of run-time behaviors, JavaScript block count, picture count, immediate redirect and response latency. The method also includes generating a reputation index for the Internet resource based on the analysis of the plurality of factors. The method also includes determining if the reputation index for the Internet resource is above a threshold value established for the local area network. The method also includes transmitting a decision transmission to the browser of the client-side device.

Another aspect of the present invention is a method for controlling access to an Internet resource. The method includes transmitting a request for an Internet resource from an Internet-enabled client application from a client-side device of a local area network. The Internet resource resides at a first server. The method also includes receiving the request for the Internet resource at a security appliance of the local area network prior to transmission of the request over the Internet. The method also includes determining if a reputation index for the Internet resource is at or above a threshold value established for the local area network. The reputation index is generated from a reputation vector for the Internet resource. The reputation vector comprises a plurality of factors for the Internet resource comprising security history, legitimacy, behavior, associations and location. The reputation index preferably resides in a database file at the security appliance, which is immediately accessible by the security appliance for determining whether or not to allow access to the Internet resource. Alternatively, the reputation index is generated in real-time at a data collection site accessible by the security appliance over the Internet, and the reputation index is forwarded to the security appliance from the data collection site upon request. The method also includes transmitting a decision transmission to the Internet-enabled client application of the client-side device. The decision transmission allows or denies access to the Internet resource.

Yet another aspect of the present invention is a method for controlling access to an Internet resource. The method includes transmitting a request for an Internet resource from a Web browser for a client-side device of a local area network. The Internet resource resides at a first server. The method also includes receiving the request for the Internet resource at a security appliance of the local area network prior to transmission of the request over the Internet. The method also includes constructing a reputation vector for the Internet resource at the security appliance. The reputation vector comprises a plurality of factors for the Internet resource comprising security history, legitimacy, behavior, associations and location. The method also includes analyzing the reputation vector to generate a reputation index for the Internet resource based on the analysis of the plurality of factors and the reputation classifier. The method also includes determining if the reputation index for the Internet resource is at or above a threshold value established for the local area network. The method also includes transmitting a decision transmission to the Web browser of the client-side device. The decision transmission allows or denies access to the Internet resource.

Yet another aspect of the present invention is a method for building a reputation database for Internet resources. The method includes collecting a plurality of factors for an Internet resource site to populate a reputation vector for the Internet resource to perform reputation analysis of the Internet resource. The method also includes receiving the plurality of factors for the Internet resource at a data collection site. The method also includes constructing a reputation vector for the Internet resource at the data collection site. The reputation vector comprises a plurality of factors for the Internet resource comprising security history, legitimacy, behavior, associations and location. The method also includes analyzing the reputation vector to generate a reputation index for the Internet resource based on the analysis of the plurality of factors and the reputation classifier. The method also includes storing the reputation index for the Internet resource at the data collection site. The method also includes transmitting the stored reputation index to a local area network upon request for managing access to the Internet resource.

The method further includes weighting each of the plurality of factors based on empirical knowledge of each of the plurality of factors. The method further includes obtaining the plurality of factors for the Internet resource using a crawler. Obtaining the plurality of factors for the Internet resource preferably comprises accessing the Internet service, analyzing a plurality of HTML documents for the Internet resource, and crawling a plurality of linked Internet resources of the plurality of HTML documents for Internet resource. Analyzing the plurality of HTML documents preferably comprises determining the JavaScript block count and the picture count of each of the HTML documents, browser hijacking, file downloads and a subject matter.

Yet another aspect of the present invention is a method for controlling access to an Internet resource. The method includes collecting a first plurality of Internet resource reputation vectors. The method also includes partitioning the first plurality of Internet resource reputation vectors into a plurality of training sets. The method also includes training a maximum entropy discrimination classifier with the plurality of training sets, the maximum entropy discrimination classifier trained for a specific local area network. The method also includes testing the trained maximum entropy discrimination classifier using a second plurality of Internet resource reputation vectors. Each of the second plurality of Internet resource reputation vectors is unknown to the trained maximum entropy discrimination classifier. The method also includes evaluating the tested maximum entropy discrimination classifier. The method also includes providing feedback to the evaluated maximum entropy discrimination classifier. The method also includes utilizing the reputation index at a local area network for managing access to an Internet resource.

Preferably, each of the first plurality of Internet resource reputation vectors comprises a plurality of dimensions for the Internet resource comprising security history, legitimacy, behavior, associations and location, and the method further comprises weighting each of the plurality of dimensions.

Yet another aspect of the present invention is a method for training a MED classifier for controlling access to an Internet resource. The method includes collecting a plurality of reputation vectors for Internet resources. The method also includes partitioning the plurality of reputation vectors into training sets. The method also includes training a MED classifier with the training sets. The method also includes testing the trained MED classifier against unknown Internet resources. The method also includes evaluating the trained MED classifier. The method also includes determining if the trained MED classifier has been adequately trained.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
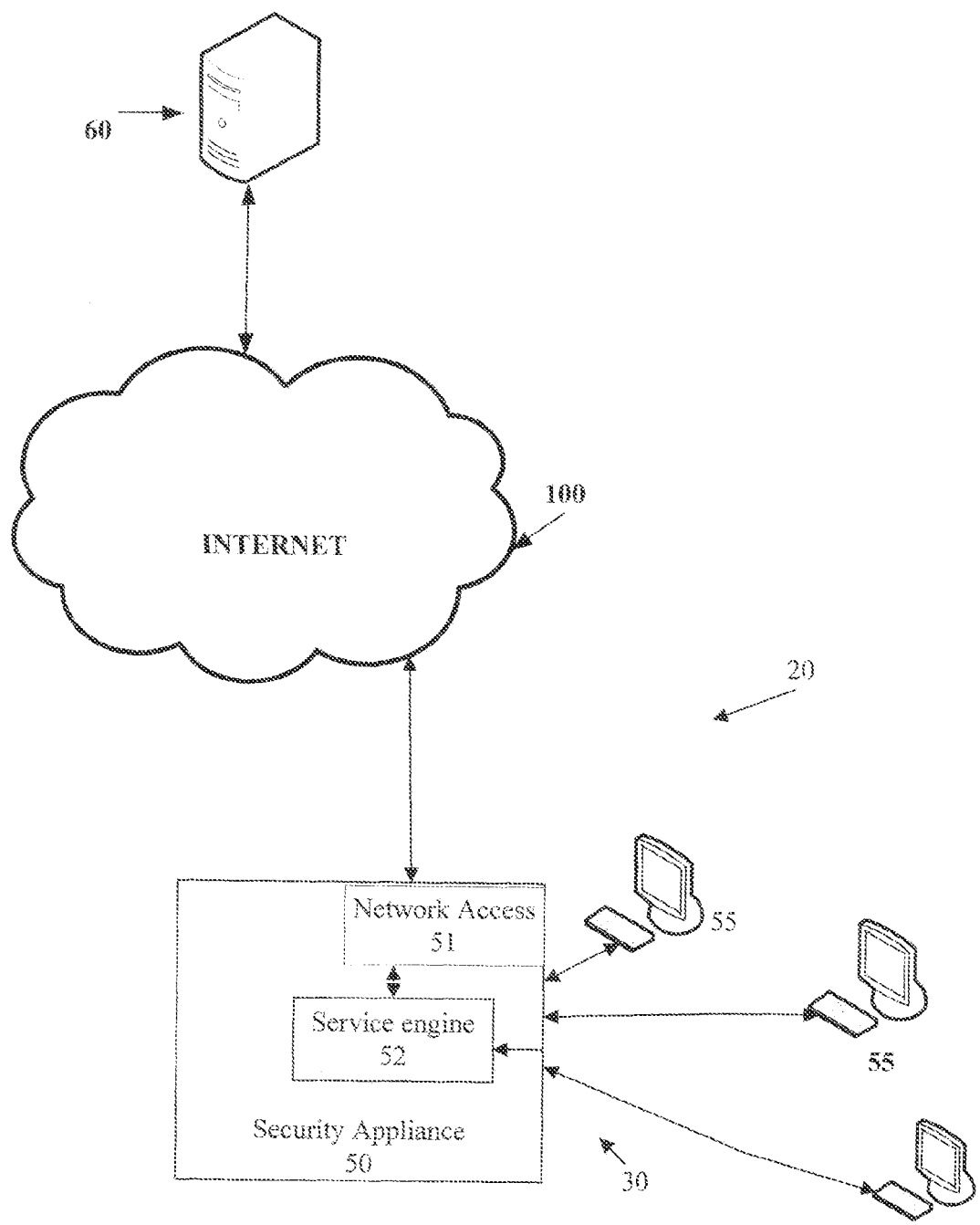
FIG. 1 is a block diagram of a system for controlling access to a Web site.

Reputation is a qualitative assessment of the safety of a website, expressed as a quantitative value that can be used in managing internet usage. Internet resources, such as Web sites, are safe, or of high reputation, if the Internet resource preferably has: a reputable ownership and registration; a consistent history; had consistent content during that history; associated with other high reputation sites; from a geographically safe region; the Internet service provider ("ISP") is well-known and reputable; not been known to be a source of malware infection; and worked cooperatively with the end-user and the end-user's Web browser application.

While security threats are transitory since they come up suddenly and are mitigated as quickly as possible, reputation is built up over a period of time and is a more enduring quality. Reputation can be lost, or become 'bad', over a period of time with repeated security events, bad associations, and bad behavior. For that reason, the occurrence of a single security breach (the site gets hacked and is a danger to visitors) does not dramatically lower the reputation of a site. Repeated occurrences over time, however, will destroy the reputation of the site.

Competitive reputation products include social considerations in their definitions, such that a highly reputable site, a site "held in high regard", preferably has these characteristics: established record of Web presence; not a source of network security risk; no introduction of malware; no popup ads; no persistent ad infection; is not pornographic or obscene; and has no illegal content.

The reputation of an Internet resource is preferably determined by security, legitimacy, behavior, geographic location, associations and additional factors. Legitimacy is determined by the top-level domain, the investment in the Internet resource (virtual hosting with non-affiliated sites, multiple hosting and SSL security), the traffic volume, the category age and the popularity rank. Legitimacy is also preferably determined by any or all of the following: the consistency between the registering and hosting city region or country; and city, region or country associated with the IP address. Behaviors include the use of popup ads, browser hijacking and the use of auto-redirecting. Associations include the number of sites linking into the site, the reputations of the linked in sites and the reputations of the linked-to sites. The geographic location includes the hosting country, the registration country, the region and the city. The geographic location also preferably includes the consistency between the registering and hosting country and the country associated with the IP address.

In a most preferred embodiment discussed below, machine learning technologies are utilized for controlling access to an Internet resource. A variation on support vector machine techniques called Maximum Entropy Discrimination ("MED") is a preferred machine learning technology. MED allows a computer to be trained to recognize the relative reputation of an Internet resource based on the features of the Internet resource. The set of features which characterize the reputation of the Internet resource is its reputation vector. Once trained, the computer uses the reputation vector for a requested Internet service to evaluate its reputation index, a score which can be used with empirically developed threshold values to block access where the reputation index is deemed to be too low to be safe.

A predictive security assessment for an Internet resource is provided based on known facts about the Internet resource, which is more secure than relying only on knowledge of previously experienced security attacks.

The system preferably provides classification of each Internet resource at run-time given a Uniform Resource Identifier (URI) and the reputation vector of the Internet resource. The system returns a score, or index, expressing the results on a relative scale for use by requesting clients, typically a security product which integrates the reputation assessment as a service.

The reputation vector preferably comprises a combination of some or all of the following: country of domain registration; country of service hosting; country of IP Address block; age of domain registration; time known to the assessor site; subject matter; classification age (time since last re-categorization); rank (popularity); IP Address; virtual hosting; number of hosts; top-level domain (.com, .biz, .ru, etc); security history; run-time behaviors; popup ads; downloadable executables; virus-infected executables; JavaScript block count; picture count; immediate redirect; and response latency. These features are collected and evaluated for all model training samples and at run-time on a per-user-request basis. Those skilled in the pertinent art will recognize that other factors may be utilized which are relevant to the security as determined by an assessor.

As shown in FIG. 1, a system for controlling access to an Internet service is generally designated 20. The system 20 preferably comprises a local area network 30, the Internet 100 and an Internet service located at a remote server 60. The Internet resource is preferably a Web site. A local area network 30 preferably comprises a security appliance 50 and a plurality of client-side devices 55. The plurality of client-side devices preferably comprises desktop computers, laptop computers, personal digital assistants, smartphones and the like. Each of the client-side devices 55 preferably has a Web-browser for accessing the Internet from the client side device 55. The security appliance 50 preferably comprises a network access 51 for permitting access to the Internet from the local area network 30, and a service engine 52 for determining if a requested Internet resource has a reputation index that meets a threshold established for the local area network 30.

Figure 3:
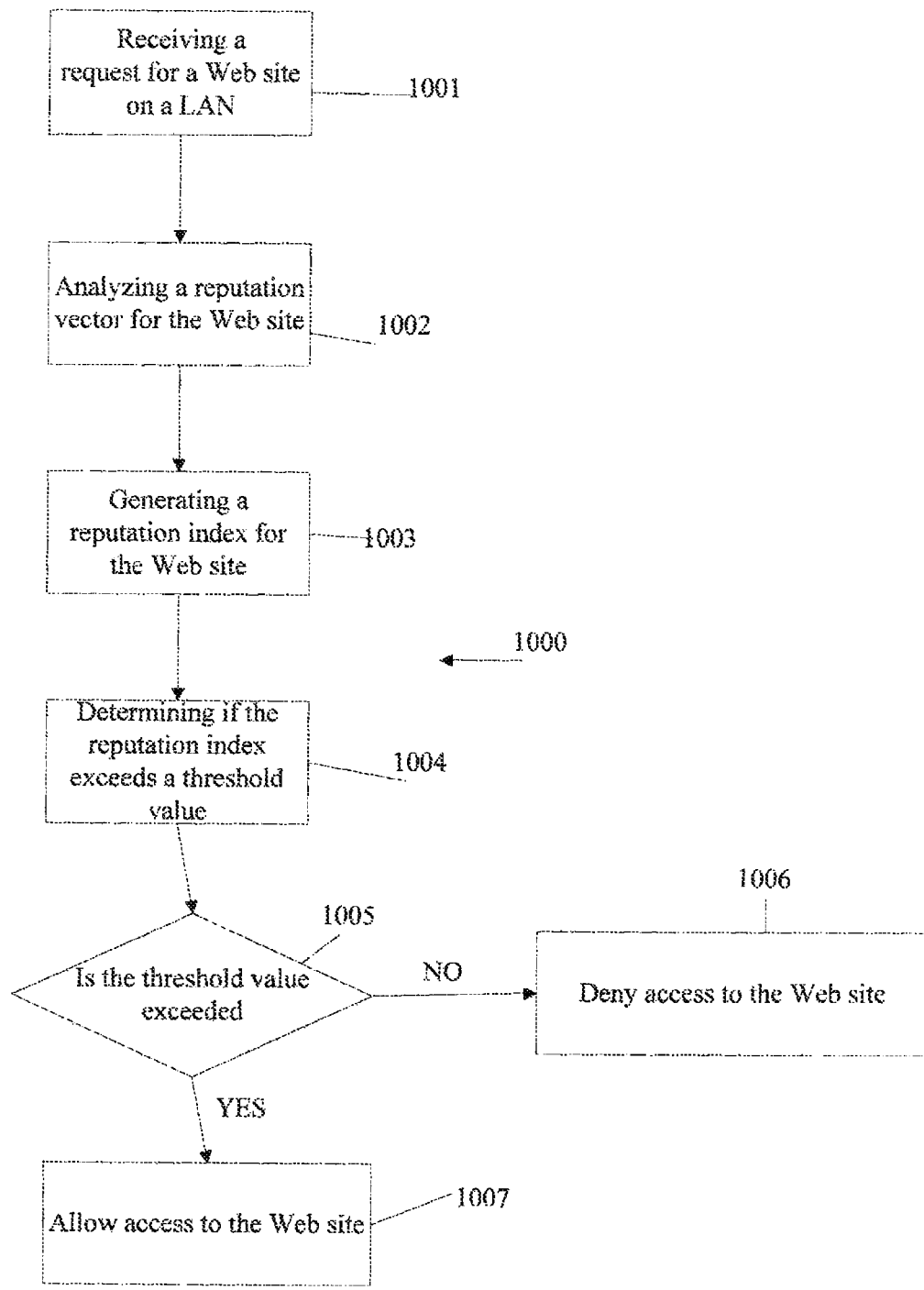
FIG. 3 is a flow chart of a method for controlling access to a Web site.
Figure 4:
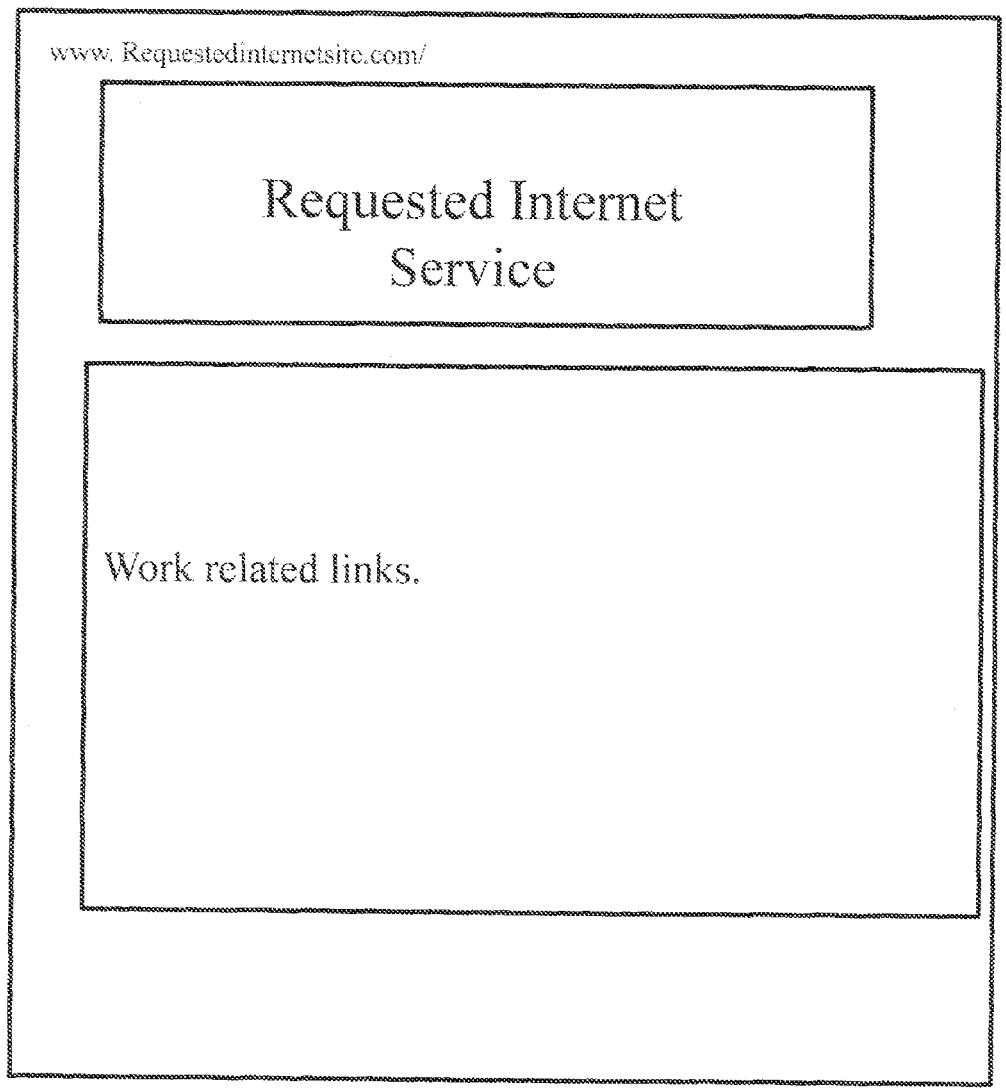
FIG. 4 is a Web page for a requested Web site.
Figure 5:
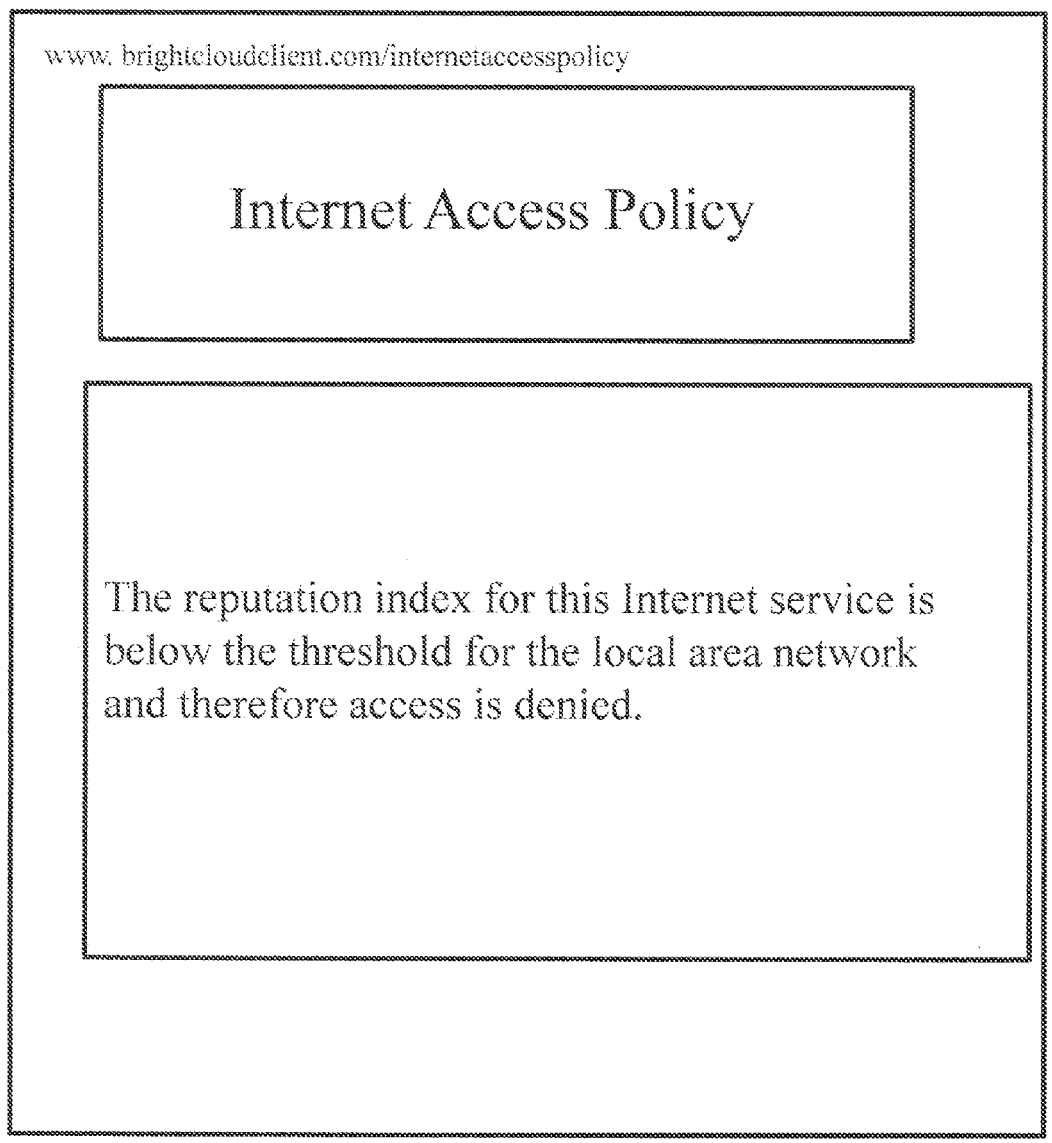
FIG. 5 is a page for a local area network informing a requestor of the denial of access to a Web site.

A method 1000 for controlling access to a Web site is shown in FIG. 3. At block 1001, a request for a Web site is transmitted from a browser for a client-side device of a local area network which is received at a security appliance of the local area network prior to transmission of the request over the Internet. At block 1002, a reputation index for the Web site is obtained at the security appliance. The reputation index is calculated from a reputation vector which preferably includes a plurality of factors for the Web site comprising country of domain registration, country of service hosting, country of an internet protocol address block, age of a domain registration, popularity rank, internet protocol address, number of hosts, to-level domain, a plurality of run-time behaviors, JavaScript block count, picture count, immediate redirect and response latency. At block 1004, a determination is made if the reputation index for the Web site is above a threshold value established for the local area network. At decision 1005, if the reputation index is not above the threshold, then at block 1006 access to the Web site is denied and a transmission of the denial is sent to the client-side device, preferably as a page 500 as shown in FIG. 5. If at decision 1005 the reputation index for the Web site is above the threshold, then the access to the Web site by the client-side device is permitted by the security appliance, and preferably, as shown in FIG. 4, a Web page 400 is provided to the client-side device.

Figure 2:
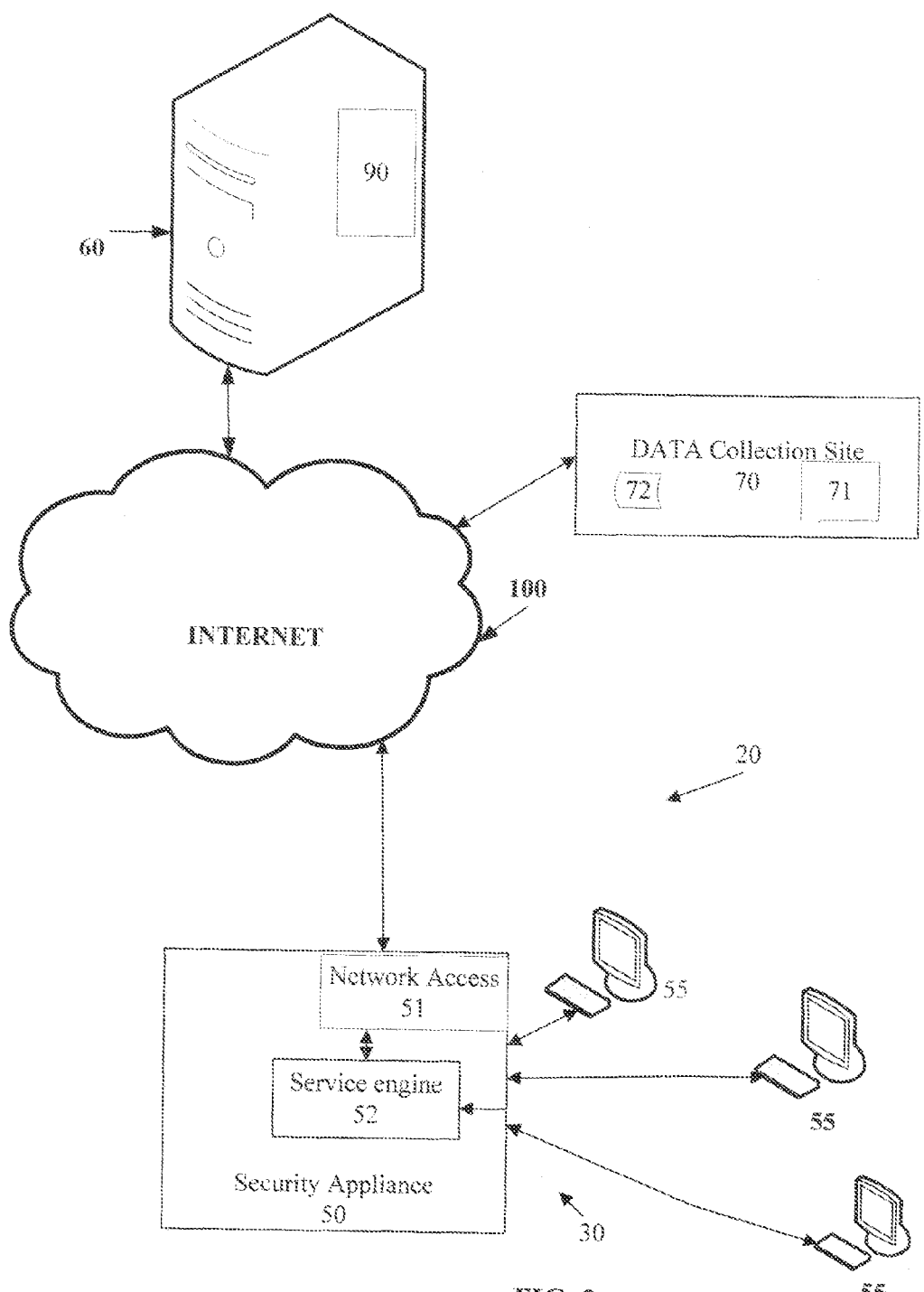
FIG. 2 is a block diagram of a system for controlling access to a Web site.

An alternative embodiment of the system 20 is illustrated in FIG. 2. The system 20 preferably comprises a local area network 30, the Internet 100, an Internet service located at a remote server 60 and a reputation generating site 70 preferably having a crawler 71 and a database 72. The Internet service is preferably a Web site. A local area network 30 preferably comprises a security appliance 50 and a plurality of client-side devices 55. Each of the client-side devices 55 preferably has a Web-browser for accessing the Internet from the client side device 55. The security appliance 50 preferably comprises a network access 51 for permitting access to the Internet from the local area network 30, and a service engine 52 for determining if a requested Internet service has a reputation index that meets a threshold establish for the local area network 30. The reputation generating site 70 provides reputation indices to service engine 52 of the security appliance 50. The reputation generating site 70 preferably utilizes the crawler 71 and other means to access Internet resources such as the Internet resource located at Web server 60. The other means preferably includes publicly available data feeds, purchased databases, proprietary database, zone files from WHOIS database.

Figure 6:
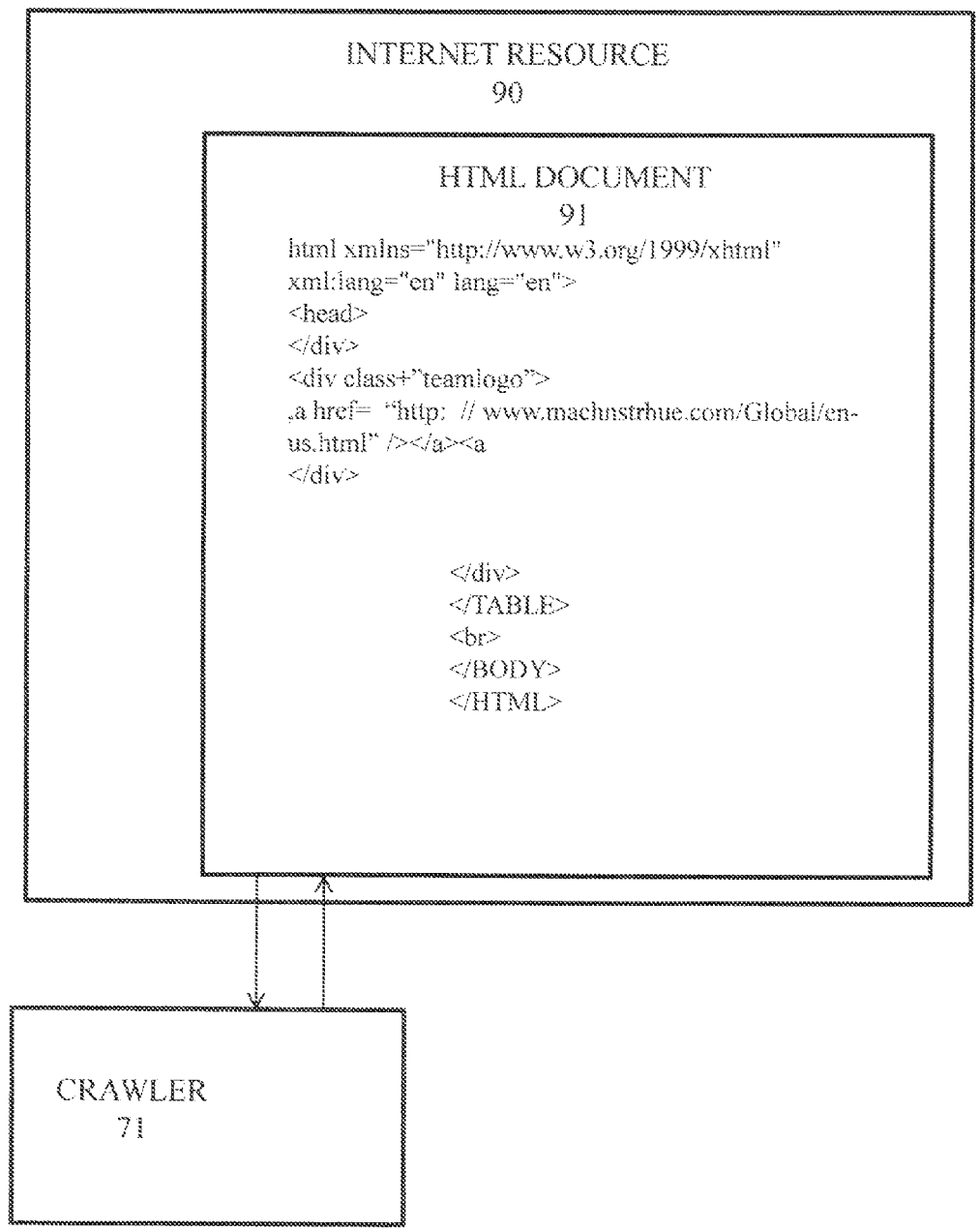
FIG. 6 is a block diagram of an Internet resource having a HTML document that is accessed by a crawler.
Figure 7:
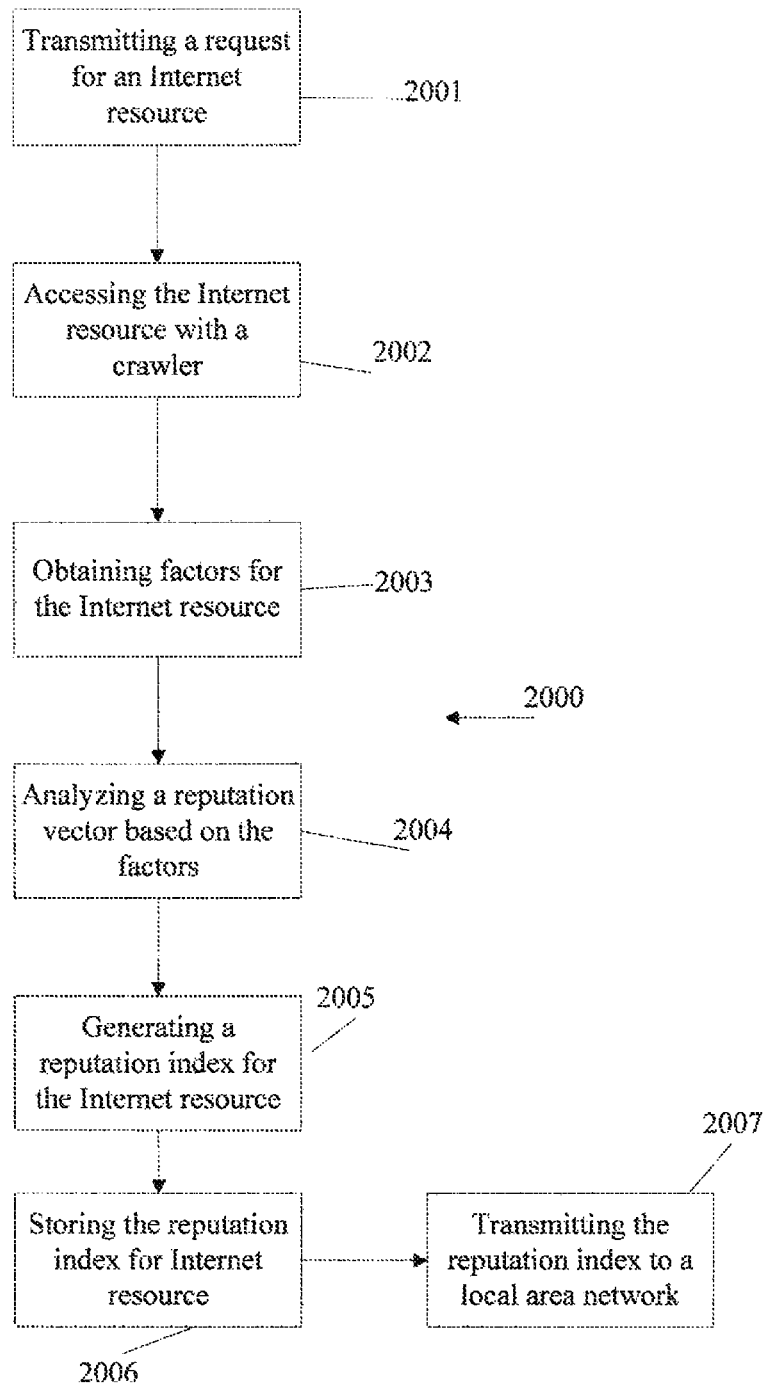
FIG. 7 is a flow chart of a method for generating a reputation index.

A flow chart for a method 2000 for generating a reputation index is shown in FIG. 7. At block 2001, a HTTP request is transmitted from a reputation generating site 70 for an Internet resource. From the HTTP request, a crawler 71 of the reputation generating site accesses the Internet resource. In accessing the Internet resource, as shown in FIG. 6, the crawler 71 preferably accesses at least one HTML document 91 of a plurality of HTML documents of the Internet resource 90. At block 2003, from the HTML documents and links within the HTML documents, the crawler 71 obtains information concerning the Internet resource 90. The reputation vector for the Internet resource 90 is based on some of this information obtained by the crawler 71. At block 2004, the reputation vector for the Internet resource is analyzed at the reputation generating site 70. At block 2005, a reputation index for the Internet resource 90 is generated at the data collection site. At block 2006, the reputation index for the Internet resource 90 is stored in a database 72 of the reputation generating site 70. The reputation for the Internet resource is available to the security appliance as updates or individual requests. At block 2007, the reputation index for the Internet resource 90 is transmitted to a LAN 30 for storage in a service engine 52 of a security appliance 50.

Figure 8:
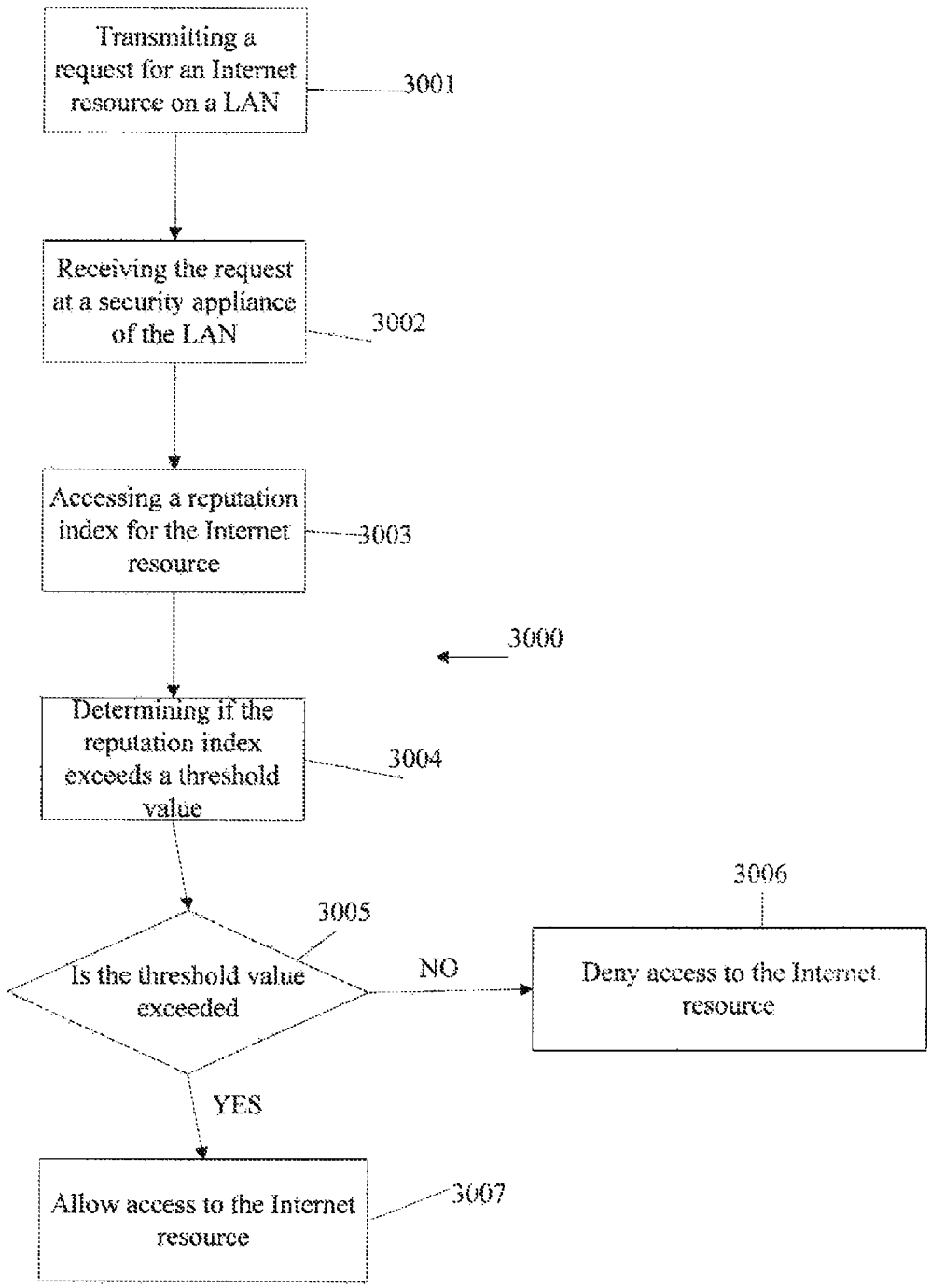
FIG. 8 is a flow chart of a method for controlling access to an Internet resource.

A flow chart for a method 3000 for controlling access to an Internet resource is shown in FIG. 8. At block 3001, a request for an Internet resource is transmitted from an Internet-enabled client application for a client-side device 55 of a LAN 30. At block 3002, the request is received at a security appliance 50 of the LAN 30 prior to transmission of the request over the Internet 100. At block 3003, a reputation index for the Internet resource is accessed from a database of a service engine 52 of the security appliance 50. The reputation index is based on a reputation vector which includes a plurality of factors for the Internet resource comprising at least two or more of country of domain registration, country of service hosting, country of an internet protocol address block, age of a domain registration, security history, popularity rank, internet protocol address, number of hosts, to-level domain, a plurality of run-time behaviors, JavaScript block count, picture count, immediate redirect and response latency. At block 3004, a determination is made if the reputation index for the Internet resource is at or above a threshold value established for the LAN 30. At decision 3005, if the reputation index is below the threshold value, then at block 3006 access to the Internet resource is denied and a transmission of the denial is sent to the client-side device 55. If at decision 3005 the reputation index for the Web site is at or above the threshold value, then the access to the Internet resource by the client-side device 55 is permitted by the security appliance 50.

Table One provides a list of the attributes for the reputation vector and a description of each of the attributes.

TABLE ONE

| Attribute | Description |
| --- | --- |
| Country | 2-letter code, 3-letter code or full name of country based on IP block |
| Top-level Domain | .com, .biz, .org, .gov, etc. |
| Domain Age | Number of months in existence on zone lists, or no less than the classification age |
| Database Age | Months since Authority was entered into database |
| Classification Age | Months that the Authority has held its current classification |
| Hosts | Number of IP's associated with the Authority |
| Virtually Hosted | T/F if the other authorities share associated IP's |
| Popups | T/F if the page opens new browser windows on its own |
| Hijack | T/F does the default page alter the browser configuration |
| JavaScript | Count of <SCRIPT> blocks in default pages |
| Executables | T/F does the authorities download executables to client |
| Pictures | Count of pictures on default page |

TABLE ONE-continued

| Attribute | Description |
| --- | --- |
| Latency | Number of milliseconds to return default page |
| Rank | Numerical ranking, used as T if <2,000,000, F otherwise in modeling |
| Infected | T/F were infected download files found by AV tools during site analysis |
| Security Trend | Number of malware infections in past 12 months |
| Total Security Count | Total number of malware infections known |
| Redirect | Authority redirects to another Authority |
| IP Address | Analysis of IP address for known threat sources, reserved IP ranges, and legacy IP address assignments |
| ISP | Internet service provider |
| City | |
| Region | |

Table Two is an example of a "good" Internet resource.

TABLE TWO

| Attribute | Value |
| --- | --- |
| Authority | USmoney.gov |
| Country | USA |
| Top Level Domain | Gov |
| Domain Age | 18 |
| Hosts | 2 |
| Virtual Hosts | 0 |
| Rank | 1 |
| Infected | 0 |
| Security Events | 0 |
| Recent Events | 0 |
| PublicCoIP | 0 |
| GovernmentIP | 1 |
| Hijack | 0 |
| JavaScript | 0 |
| Executables | 0 |
| Pictures | 0 |
| Latency | 0 |
| Redirect | 0 |

Table Three is an example of a "bad" Internet resource.

TABLE THREE

| Attribute | Value |
| --- | --- |
| Authority | www.c.reditcan.cn |
| Country | CN |
| Top Level Domain | CN |
| Domain Age | 3 |
| Hosts | 1 |
| Virtual Hosts | 1 |
| Rank | 0 |
| Infected | 0 |
| Security Events | 1 |
| Recent Events | 1 |
| PublicCoIP | 0 |
| GovernmentIP | 0 |
| Hijack | 0 |
| JavaScript | 13 |
| Executables | 1 |
| Pictures | 14 |
| Latency | 826 |
| Redirect | 0 |

Depending on the threshold value established by the administrator of the LAN, the Internet resource of www.c.reditcan.cn with an reputation index value of 51, is not available for access by a user based on its reputation index, and the Internet resource of www.USmoney.GOV is available for access by a user based on its reputation index 95. Thus, even if the Internet resource of www.c.reditcan.cn is not a known source of malware or viruses, the present invention would prevent an end user client from accessing the Internet resource since its reputation index is deemed unsafe.

Another embodiment uses a MED algorithm to build a statistical model on a Web page based on good and bad Internet samples. This embodiment uses a unique optimization algorithm for training, as well as two other optimization steps for calibrating the outputs to be probabilities, in a process that tolerates some input errors while still yielding reliable outputs. Training process feedback loops guide the implementer to improve the model data through splitting data into sets for holdout, training, and testing guided by two criteria: most violating examples, and least understood examples. The implementer using the criteria iteratively improves the quality of the training set which also reduces classifier errors and is exponentially faster than having the implementer manually verify or check the example assignments to categories in random or haphazard order. The examples are randomly reassigned before every training iteration to improve generalization. Sparse matrix math during the classification process improves processing speeds to enable a modest computer to classify millions of URLs per day. The implementation allows for a multiple of dimensions, each representing a fact about the Internet resource, to be included in the reputation model, while classification speed of any particular Internet resource is independent of the number of total dimensions in its reputation vector.

This embodiment is preferred since classifying a large percentage of existing Web sites into reputation risk assessments quickly and efficiently requires an automated process because the number of humans required is too large to be practical or economical. Further, defining automated classification rules by hand is very hard and requires writing many thousands of extremely specific as well as vague rules. All of these rules will interact with each other in an exponential number of ways, making human-based rule construction a daunting effort as well. The machine learning approach of this embodiment solves the problem by having humans define "training sets" or examples of each topic for the classifier, which then "trains" by optimizing the weights each factor should have in order to reduce classification error the most.

In addition to providing a good implementation of the learning algorithm, this embodiment efficiently utilizes the human efforts in identifying examples of good and bad reputations.

This embodiment preferably applies an effective learning formulation based on the principles and theory of MED with an efficient optimization algorithm based on the principles of Platt's sequential minimization optimization ("SMO"), in conjunction with an overall optimization of tunable parameters and calibrated confidence scores, to solve the learning problem given proper examples of Web sites of good and bad reputation.

The process then involves having humans examine a list of "most violating" examples, the examples which were marked as being good reputations but received extremely low confidence scores from the classifier (and vice-versa), as well as "least understood" examples, the examples which receive a confidence score close to the prior probability of the reputation.

By spending human time examining these two classes of examples, the classifier benefits from having egregiously misclassified examples being put into the proper reputation (good or bad) as well as providing the classifier with the largest amount of new information as quickly as possible. This combination improves the classifier's real-world effectiveness very quickly with minimal human effort. Thus, this embodiment efficiently combines human and automated work to solve the problem of automated reputation classification of Internet resources.

In one method, an evaluation of multiple factors (such as discussed above) is included in determining a reputation vector for an Internet resource. This process is done for multiple Internet resources. Next, reputation vectors for a large sample of Internet resources are collected at a data collection site. Next, a MED classifier is trained using the collection of reputation vectors based on training sets of known high reputation Internet resources and low reputation Internet resources. Next, a MED-based model for classification is tested against a wide variety of random samples of Internet resources. Next, a security appliance is deployed at a LAN. Next, a run-time evaluation of Internet resource requests is performed in using the developed MED classifier for responding to reputation index information requests from clients based on a LAN security policy. The MED-based model for classification is preferably utilized at run-time to calculate a reputation index. In this manner, this embodiment provides a predictive security assessment based on known facts about an Internet resource, which is more secure than relying only on knowledge of previously experienced security attacks. This embodiment provides a LAN real-time updates, real-time classification of non-cached URLs and a real-time feedback loop.

Figure 9:
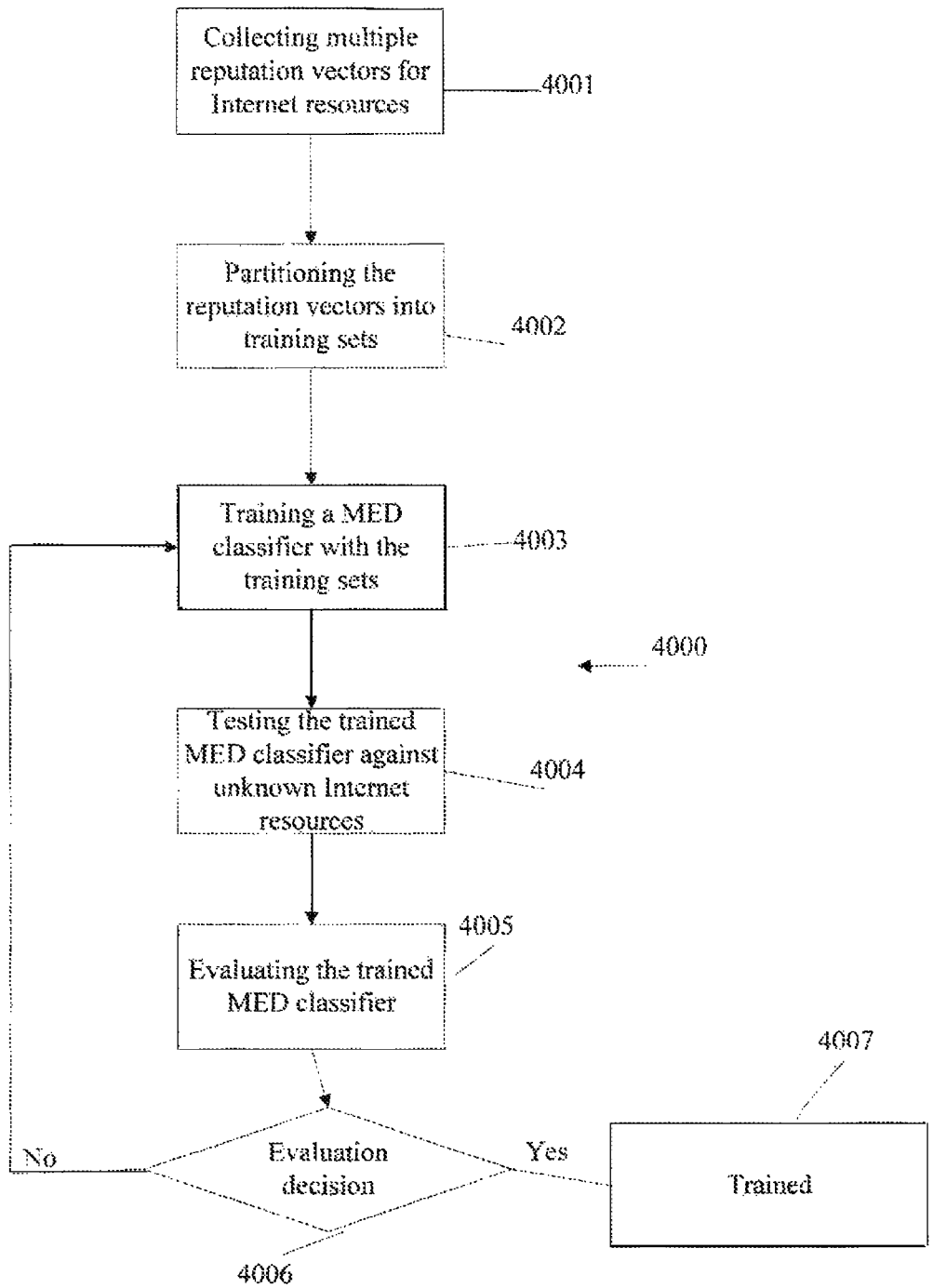
FIG. 9 is a flow chart of a method for utilizing a MED classifier for controlling access to an Internet resource.

A flow chart of a method 4000 for utilizing a MED classifier for controlling access to an Internet resource is shown in FIG. 9. At block 4001, multiple reputation vectors for a large sample of Internet resources are collected preferably at a reputation generating site. The reputation vectors for the Internet resources are previously generated as discussed above. At block 4002, the reputation vectors are partitioned into multiple training sets. The training sets comprise at least two training sets divided into high reputation Internet resources and low reputation Internet resources. At block 4003, a MED classifier is trained using the training sets of high reputation Internet resources and low reputation Internet resources to create a trained MED classifier. At block 4004, the trained MED classifier is tested against a wide variety of Internet resources which are not grouped into training sets and the reputation index is unknown to the trained MED classifier. At block 4005, the tested MED classifier is evaluated to determine the accuracy of the tested MED classifier and to determine the most violating examples of either a wrongly categorized high reputation Internet resource or low reputation Internet resource, and the least understood Internet resources. At decision block 4006, an evaluation of the testing is performed. If the testing was performed correctly, then at block 4007 the MED classifier is considered trained and ready for operations. If the testing was inadequate feedback is provided to the MED classifier concerning the wrongly categorized high reputation Internet resources or low reputation Internet resources, and the least understood Internet resources. The process is continued at block 4003 again until the MED classifier is properly trained.

Figure 10:
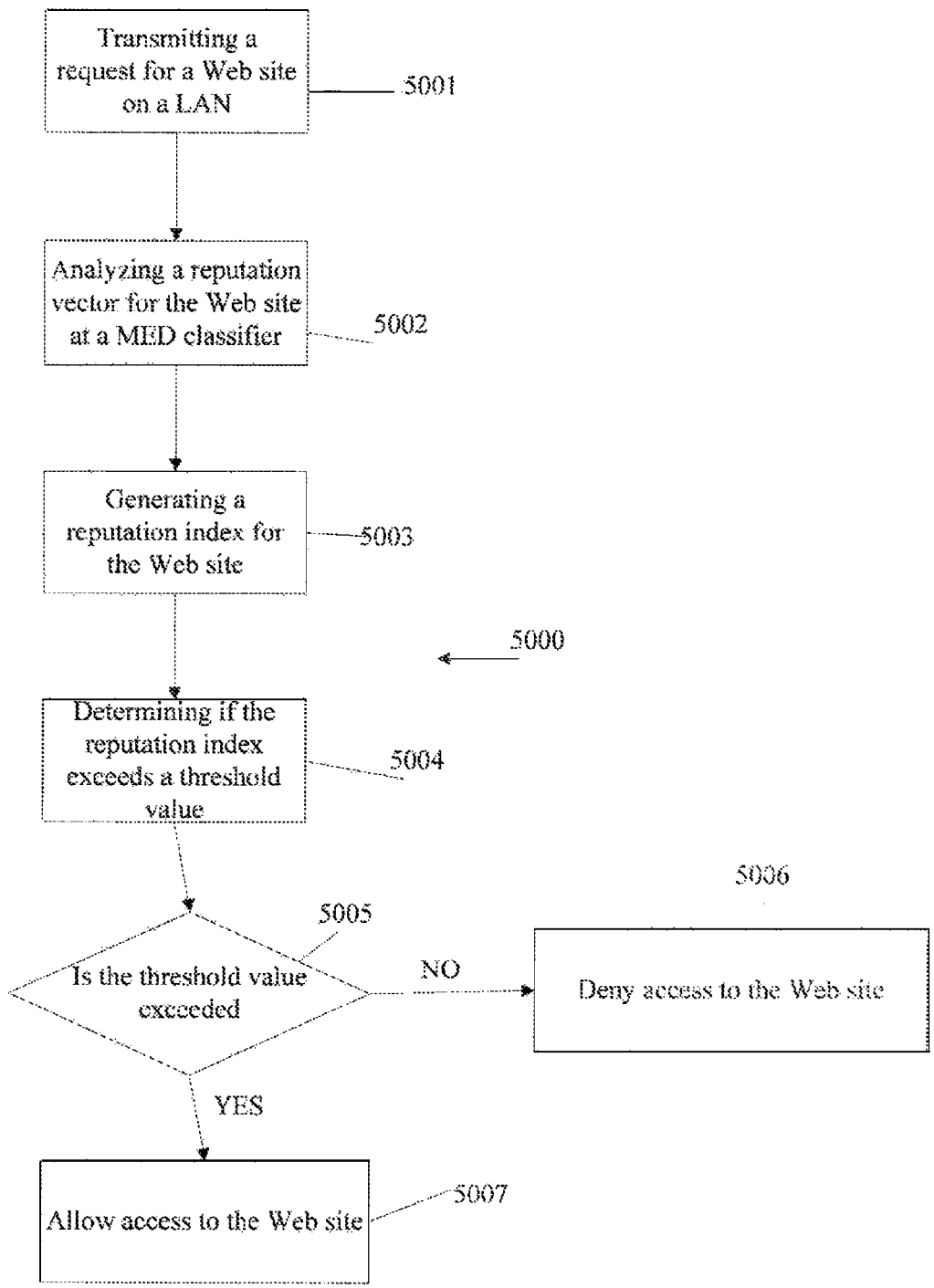
FIG. 10 is flow chart of a method for controlling access to an Internet resource utilizing a MED classifier.

In another embodiment, a reputation index is returned immediately from a stored set of reputation indexes calculated prior to the user's request. As shown in FIG. 10, a method for controlling access to an Internet resource utilizing a MED classifier is generally designated 5000. At block 5001, a request for an Internet resource is transmitted from an Internet-enabled client application for a client-side device 55 of a LAN 30. At block 5002, a reputation vector for the Internet resource is analyzed preferably at a MED classifier or at a security appliance for the LAN. At block 5003, a reputation index for the Internet resource is accessed/generated from a database of a service engine 52 of the security appliance 50. The reputation index is preferably based on a reputation vector which includes a plurality of factors for the Internet resource comprising at least two or more of country of domain registration, country of service hosting, country of an internet protocol address block, age of a domain registration, security history, popularity rank, internet protocol address, number of hosts, to-level domain, a plurality of runtime behaviors, JavaScript block count, picture count, immediate redirect and response latency. At block 5004, a determination is made if the reputation index for the Internet resource is at or above a threshold value established for the LAN 30. At decision 5005, if the reputation index is below the threshold value, then at block 5006 access to the Internet resource is denied and a transmission of the denial is sent to the client-side device 55. If at decision 5005 the reputation index for the Web site is at or above the threshold value, then the access to the Internet resource by the client-side device 55 is permitted by the security appliance 50. In such an embodiment, a pre-calculated reputation index residing on the LAN or quickly available to the security appliance of the LAN provides for a much faster response (if not immediate response) as to the accessibility of the Internet resource.

Figure 11:
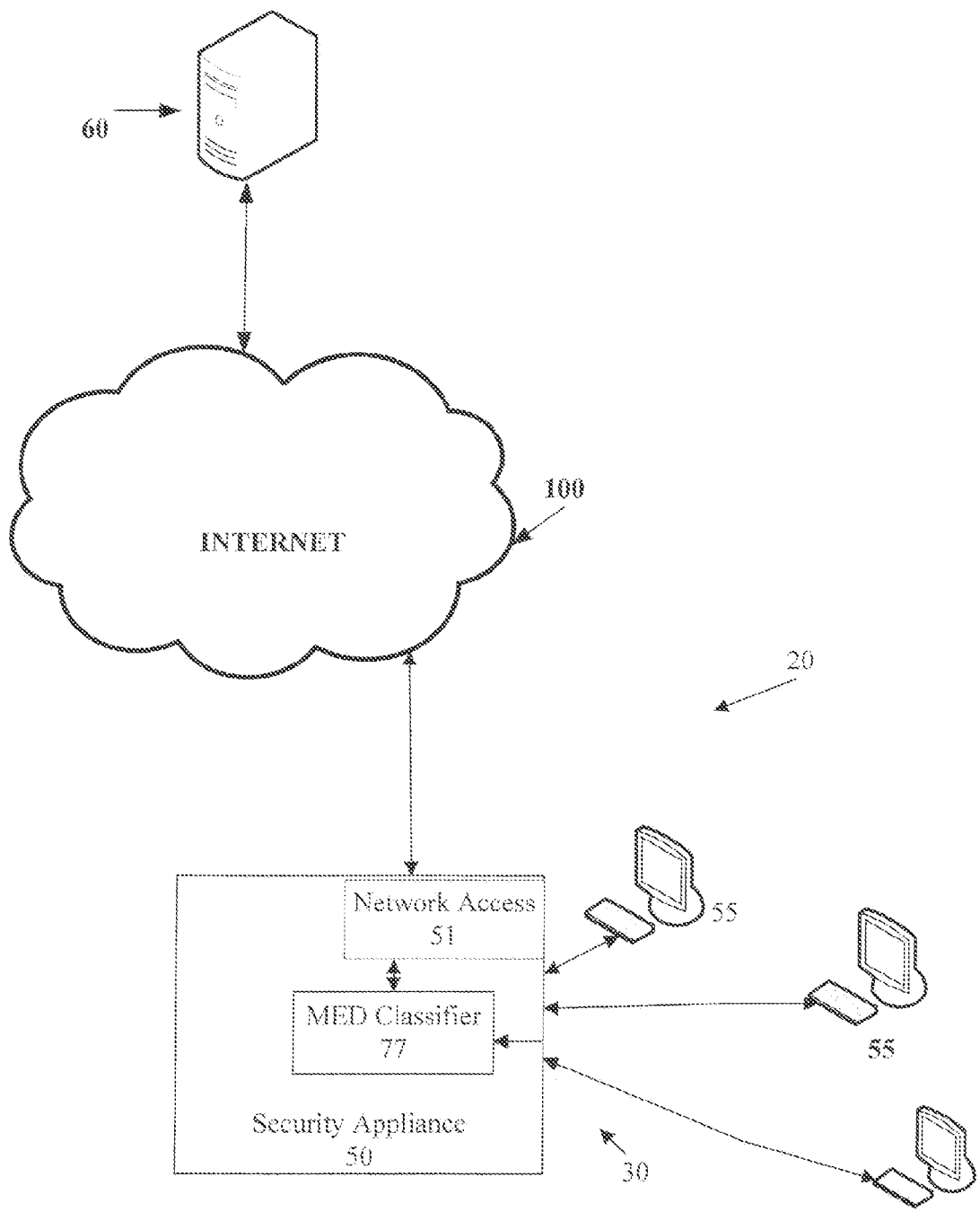
FIG. 11 is a block diagram of a system for utilizing a MED classifier for controlling access to an Internet resource.

FIG. 11 illustrates a system 20 for controlling access to an Internet resource utilizing a MED classifier site 77. The system 20 preferably comprises a local area network 30, the Internet 100, a MED classifier site 77, and an Internet service located at a remote server 60. The Internet resource is preferably a Web site. A local area network 30 preferably comprises a security appliance 50 and a plurality of client-side devices 55. Each of the client-side devices 55 preferably has a Web-browser for accessing the Internet from the client side device 55. The security appliance 50 preferably comprises a network access 51 for permitting access to the Internet from the local area network 30, based on data from the MED classifier site 77, which determines if a requested Internet resource has a reputation index that meets a threshold establish for the local area network 30.

Table Four provides an example of some dimensions and the sorted model weights of the MED classifier.

TABLE FOUR

| Identification | Dimension | Sorted Model weights |
|---|---|---|
| 1966272070 | Domain age | 3.785360 |
| 2307717 | gov | 1.969750 |
| 1906396306 | paris | 0.647784 |
| 1477426223 | Hijack | −19.887100 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for controlling access to an Internet resource, the method comprising:

transmitting a request for an Internet resource from an Internet-enabled client application from a client-side device of a local area network, the Internet resource residing at a first server;

receiving the request for the Internet resource at a security appliance of the local area network prior to transmission of the request over the Internet;

determining if a reputation index for the Internet resource is at or above a threshold value established for the local area network, the reputation index generated from a reputation vector for the Internet resource, the reputation vector comprising a plurality of factors for the Internet resource comprising security history, legitimacy, behavior, associations and location, wherein the location factor of the plurality of factors for the reputation vector comprises two or more of: country of domain registration, country of service hosting and country of an internet protocol address block, wherein the legitimacy factor of the plurality of factors for the reputation vector comprises two or more of: age of a domain registration, popularity rank, internet protocol address, number of hosts, top-level domain, and wherein the behavior factor of the plurality of factors for the reputation vector comprises at least one of: plurality of run-time behaviors, script block count, picture count, immediate redirect and response latency; and transmitting a decision transmission to the Internet-enabled client application of the client-side device, the decision transmission allowing or denying access to the Internet resource.

2. The method according to claim 1, wherein the reputation index for the Internet resource is at or above the threshold value and wherein the decision transmission is access to the Internet resource, the method further comprises transmitting the request for the Internet resource over the Internet to the first server for the Internet resource and receiving the Internet resource at the local area network.

3. The method according to claim 1, wherein the reputation index for the Internet resource is below the threshold value, and wherein the decision transmission is a Web page from the local area network containing information that accessing the Internet resource is against an Internet policy established on the local area network.

4. The method according to claim 1, wherein the Internet resource is one of a Web site, an email server and a voice communications server.

5. The method according to claim 1, wherein the reputation index is received from a data collection site accessible by the security appliance over the Internet.

6. The method according to claim 1, wherein the reputation index is stored at a remote reputation generating site.

7. A system for controlling access to a Web site, the system comprising:

a network, the network comprising the Internet;

an Internet resource hosted at a first server and accessible over the Internet; and a local area network, the local area network comprising:

a plurality of client-side devices, each of the client-side devices having a browser; and a security appliance, the security appliance controlling access to the Internet by each of the plurality of client-side devices, the security appliance having a service engine for analyzing a reputation vector for the Web site and generating a reputation index for the Web site from the reputation vector, the reputation vector comprising a plurality of factors for the Internet resource comprising security history, legitimacy, behavior, associations and location, wherein the location factor of the plurality of factors for the reputation vector comprises two or more of: country of domain registration, country of service hosting and country of an internet protocol address block, wherein the legitimacy factor of the plurality of factors for the reputation vector comprises two or more of: age of a domain registration, popularity rank, internet protocol address, number of hosts, top-level domain, and wherein the behavior factor of the plurality of factors for the reputation vector comprises at least one of: plurality of run-time behaviors, script block count, picture count, immediate redirect and response latency;

wherein access to the Internet resource by any of the plurality of client-side devices is determined based on the reputation index exceeding a threshold value established for the local area network.

8. The system according to claim 7, wherein the client-side device is a personal computer or a PDA.

9. The system according to claim 7, further comprising a data collection site accessible over the Internet, the security site having a crawler for collecting a plurality of factors from a plurality of Internet resources.

10. The system according to claim 9, wherein the data collection site has a database containing reputation indices for a plurality of Internet resources.

11. A method for controlling access to an Internet resource, the method comprising:

transmitting a request for an Internet resource from a Web browser for a client-side device of a local area network, the Internet resource residing at a first server;

receiving the request for the Internet resource at a security appliance of the local area network prior to transmission of the request over the Internet;

accessing a reputation index for the Internet resource, the reputation index based on a reputation vector for the Internet resource comprising security history, legitimacy, behavior, associations and location, wherein the location factor of the plurality of factors for the reputation vector comprises two or more of: country of domain registration, country of service hosting and country of an internet protocol address block, wherein the legitimacy factor of the plurality of factors for the reputation vector comprises two or more of: age of a domain registration, popularity rank, internet protocol address, number of hosts, top-level domain, and wherein the behavior factor of the plurality of factors for the reputation vector comprises at least one of: plurality of run-time behaviours, script block count, picture count, immediate redirect and response latency;

determining if the reputation index for the Internet resource is at or above a threshold value established for the local area network; and transmitting a decision transmission to the Web browser of the client-side device, the decision transmission allowing or denying access to the Internet resource.

12. The method according to claim 11, further comprising transmitting the reputation index over the Internet to the local area network.

13. A method for building a reputation database for Internet resources, the method comprising:

collecting a plurality of factors for an Internet resource site to populate a reputation vector for the Internet resource to perform reputation analysis of the Internet resource;

receiving the plurality of factors for the Internet resource at a data collection site;

constructing a reputation vector for the Internet resource at the data collection site, the reputation vector comprising a plurality of factors for the Internet resource comprising security history, legitimacy, behavior, associations and location, wherein the location factor of the plurality of factors for the reputation vector comprises two or more of: country of domain registration, country of service hosting and country of an internet protocol address block, wherein the legitimacy factor of the plurality of factors for the reputation vector comprises two or more of age of: a domain registration, popularity rank, internet protocol address, number of hosts, top-level domain, and wherein the behavior factor of the plurality of factors for the reputation vector comprises at least one of: plurality of run-time behaviours, script block count, picture count, immediate redirect and response latency;

analyzing the reputation vector to generate a reputation index for the Internet resource based on the analysis of the plurality of factors and the reputation classifier;

storing the reputation index for the Internet resource at the data collection site; and transmitting the stored reputation index to a local area network upon request for managing access to the Internet resource.

14. The method according to claim 13, further comprising weighting each of the plurality of factors based on empirical knowledge of each of the plurality of factors.

15. The method according to claim 13, further comprising obtaining the plurality of factors for the Internet resource using a crawler.

16. The method according to claim 15, wherein obtaining the plurality of factors for the Internet resource comprises accessing the Internet service, analyzing a plurality of HTML documents for the Internet resource, and crawling a plurality of linked Internet resources of the plurality of HTML documents for Internet resource.

17. The method according to claim 15, wherein analyzing the plurality of HTML documents comprises determining the script block count and the picture count of each of the HTML documents, browser hijacking, file downloads and a subject matter.

18. The method according to claim 13, wherein the stored reputation index is transmitted over the Internet to a local area network.

19. A method for controlling access to an Internet resource, the method comprising:

collecting a first plurality of Internet resource reputation vectors;

partitioning the first plurality of Internet resource reputation vectors into a plurality of training sets;

training a maximum entropy discrimination classifier with the plurality of training sets, the maximum entropy discrimination classifier trained for a specific local area network;

testing the trained maximum entropy discrimination classifier using a second plurality of Internet resource reputation vectors, the second plurality of Internet resource reputation vectors unknown to the trained maximum entropy discrimination classifier;

evaluating the tested maximum entropy discrimination classifier;

providing feedback to the evaluated maximum entropy discrimination classifier; and utilizing the maximum entropy discrimination classifier at a local area network for managing access to an Internet resource.

20. The method according to claim 19, wherein each of the first plurality of Internet resource reputation vectors comprises a plurality of dimensions for the Internet resource comprising security history, legitimacy, behavior, associations and location, and the method further comprises weighting each of the plurality of dimensions.

21. The method according to claim 19, wherein at least one of collecting, training, and testing is performed external to the local area network.

22. A method for training a maximum entropy discrimination (MED) classifier for controlling access to an Internet resource, the method comprising:

collecting a first plurality of reputation vectors for Internet resources;

partitioning the first plurality of reputation vectors for the Internet resources into one or more training sets;

training a MED classifier with the plurality of training sets, the maximum entropy discrimination classifier being trained for a specific local area network;

testing the trained MED classifier using a second plurality of Internet resource reputation vectors, the second plurality of Internet resource reputation vectors unknown to the trained MED classifier;

evaluating the tested MED classifier; and determining if the tested MED classifier has been adequately trained.

23. The method according to claim 22, wherein the training set comprises good reputation Internet resources and bad reputation Internet resources.

24. The method according to claim 22, further comprising locating the trained MED classifier at a security appliance of the local area network.

25. The method according to claim 22, wherein at least one of collecting, training, and testing is performed external to the local area network.

26. The method according to claim 22, wherein each of the first plurality of Internet resource reputation vectors comprises a plurality of dimensions for the Internet resource comprising security history, legitimacy, behavior, associations and location.

* * * * *